(12) United States Patent
Polyakov et al.

(10) Patent No.: US 9,223,417 B1
(45) Date of Patent: Dec. 29, 2015

(54) METHOD AND APPARATUS FOR ON-THE-RUN PROCESSING OF ELECTRONIC INK USING DIGITAL FILTERING AND ADAPTIVE PARAMETERIZATION

(75) Inventors: Vladislav Polyakov, Santa Cruz, CA (US); Boris Gorbatov, Sunnyvale, CA (US); Fedor Trushkin, Moscow (RU); Alexander Pashintsev, Cupertino, CA (US)

(73) Assignee: Evernote Corporation, Redwood City, CA (US)

( * ) Notice: Subject to any disclaimer, the term of this patent is extended or adjusted under 35 U.S.C. 154(b) by 1011 days.

(21) Appl. No.: 12/363,364

(22) Filed: Jan. 30, 2009

Related U.S. Application Data

(60) Provisional application No. 61/063,664, filed on Feb. 4, 2008.

(51) Int. Cl.
*G06F 3/033* (2013.01)
*G06F 3/0354* (2013.01)
*G06F 3/0488* (2013.01)
*G06F 3/03* (2006.01)

(52) U.S. Cl.
CPC .......... *G06F 3/03545* (2013.01); *G06F 3/0317* (2013.01); *G06F 3/0488* (2013.01)

(58) Field of Classification Search
CPC .... G06F 3/03545; G06F 3/04883; G06F 3/0317
USPC .................................. 345/213; 382/275, 187
See application file for complete search history.

(56) References Cited

U.S. PATENT DOCUMENTS

| | | | | |
|---|---|---|---|---|
| 4,965,845 A | * | 10/1990 | Chan et al. | 382/166 |
| 5,559,897 A | * | 9/1996 | Brown et al. | G06K 9/00429 382/119 |
| 6,044,171 A | * | 3/2000 | Polyakov et al. | 382/159 |
| 7,437,003 B1 | | 10/2008 | Gorbatov et al. | |
| 7,542,622 B1 | * | 6/2009 | Angelini et al. | 382/275 |
| 2006/0290698 A1 | * | 12/2006 | Wang et al. | 345/442 |

* cited by examiner

*Primary Examiner* — Towfiq Elahi
(74) *Attorney, Agent, or Firm* — Muirhead and Saturnelli, LLC

(57) ABSTRACT

A method and system for on-the-run processing of source data is disclosed. In one embodiment, the system includes an input device to trace the moving object, such as a pen, an on-the-run filter, coupled to the input device, to perform denoising of the source data without noticeable shrinkage of the trace using recursive reparameterization filtering, and a storage device, coupled to the on-the-run filter, to compress and store the data.

36 Claims, 7 Drawing Sheets

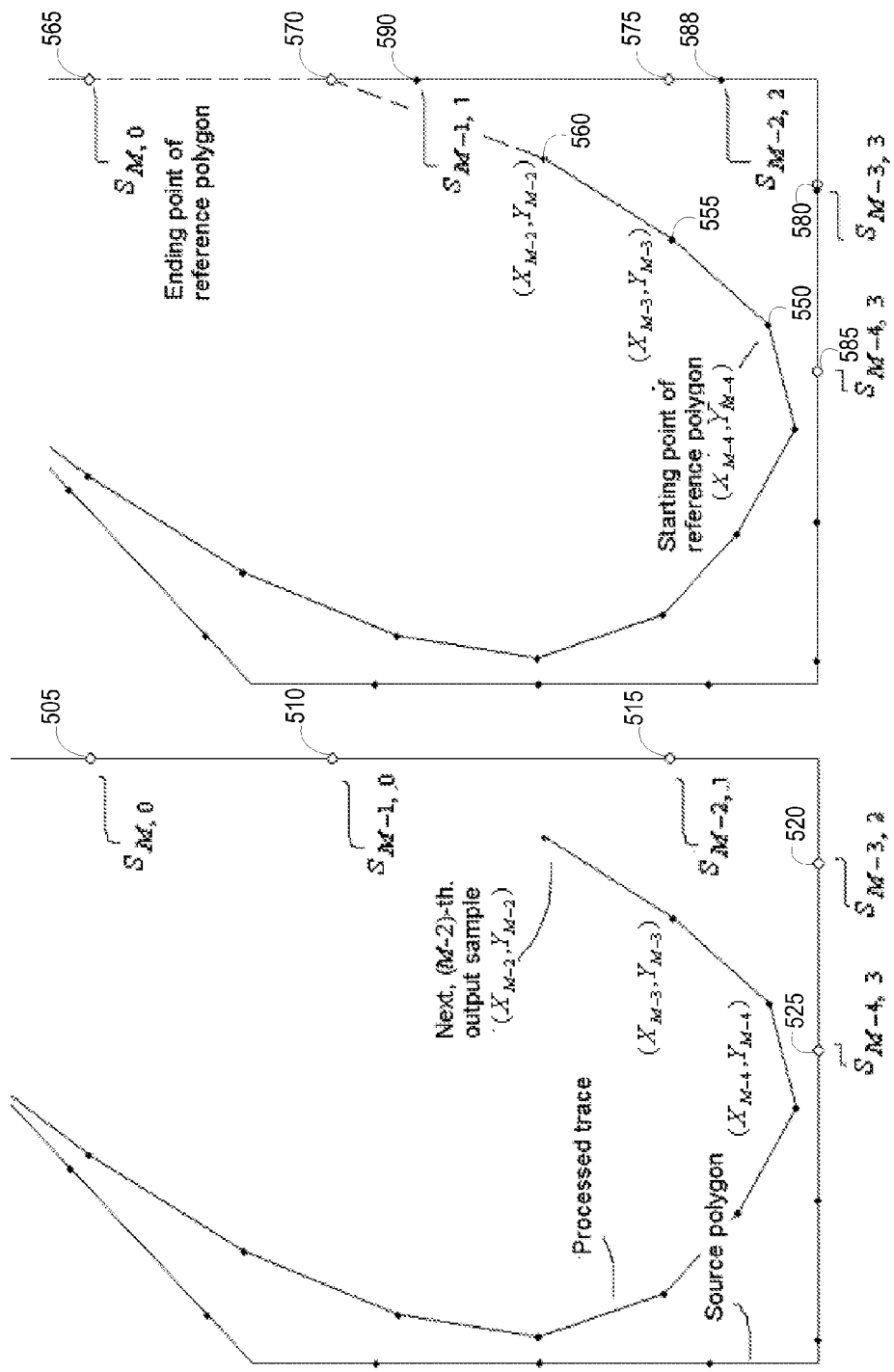

METHOD AND APPARATUS FOR ON-THE-RUN PROCESSING OF ELECTRONIC INK USING DIGITAL FILTERING AND ADAPTIVE PARAMETERIZATION

RELATED APPLICATIONS

This application claims the benefit of U.S. Provisional Application No. 61/063,664, filed Feb. 4, 2008, which is incorporated herein by reference.

FIELD OF THE INVENTION

Embodiments of the invention relate to real-time processing and rendering of traces generated by multi-component signals, and in particular to on-the-run processing of pen strokes in electronic ink, using digital filtering and adaptive parameterization.

BACKGROUND

A trajectory of the moving point on the screen, such as a pen stroke in electronic ink or a trace of a vector-EKG, is defined typically by a multi-component signal representing the trajectory in parametric form. For example, a pen stroke in simple electronic ink is a plain curve defined by a two-component parametric representation, i.e. a sequence of sample points specified as coordinate pairs. Space curves defined by a three-component parametric representation can be provided, in particular, by advanced graphic tablets sensitive to the distance between pen and the surface of the tablet. A number of extra components, representing physical entities other than spatial coordinates, may be provided in addition to parametric representation of a curve. For example, variable-thickness lines drawn by means of pressure-sensitive graphic tablets are plain curves defined by a three-component sequence of samples, in which an extra sample, representing pressure, is added to each pair of coordinate samples.

Graphical representation of signals often suffers from noise. For example, visual quality of electronic ink may be affected by combined noise of motor tremor and digitization, especially in hand-held devices. There are many filtering techniques for denoising of graphically represented signals. One common approach is to apply a low-pass digital filter to every component, or a subset of components, in the sequence of samples as they are coming from the trace generator. This approach allows for on-the-run denoising (smoothing) of the pen stroke since the filtering delays, in terms of time and arclength, may be short enough to keep the processing unnoticeable to a user.

However, low-pass filtering typically distorts the shape of resulting curves. For example, in cursive writing, relatively small fragments may be very important for visual perception with respect to both legibility and aesthetic appearance, but noise in electronic ink often creates disturbances that are comparable in size with these critical fragments. Generally, the coordinate signals of handwriting and drawing, and the noise in electronic ink tend to have partially overlapped spectra. When filtering electronic ink, such overlapping tends to cause shape distortion and residual noise. Additional complications may also arise due to high variability in the individual manner of handwriting and in hardware-specific noise. Typically, as a result of low-pass filtering, the sharp cusps in electronic ink are cut, the critical fragments of handwriting are partially lost to smoothing, and handwritten lines look like they are somewhat shrunk in a vertical direction.

A number of existing techniques allow smoothing without the appearance of shrinking. A technique involving adaptive parameterization to address both the local distortion and overall shrinkage effects of low-pass filtering is disclosed in U.S. patent application Ser. No. 11/013,869 invented by B. E. Gorbatov et al. and entitled System and Method for Handling Electronic Ink (hereinafter "Gorbatov"), the teachings of which are hereby incorporated by reference. Gorbatov uses a low-pass smoothing filter to run a repetitive trial-and-error procedure of discarding excessive sample points and displacing the remaining sample points. A low-pass approximation filter is applied to generate a trial version of a curve each time a sample point under testing is removed from the current parametric representation and remaining sample points are displaced to correct shrinkage. The rarified and displaced sample points are filtered each time as parametrically equidistant points, resulting finally in parametric representation adapted to some extent to the chosen filter.

Filtering with adaptive parameterization, as described above, provides better denoising, better visual quality of electronic ink, and reduces data size. However, the method requires a whole pen stroke or significant part of it to be involved in iterative processing and, therefore, makes it impossible to hide the processing from the user.

The above described method reflects the state of advanced, in terms of the noise and shrinkage reduction, techniques to expand the processing over an enlarged part of a trace behind the moving point, thus keeping that part in transitional state. Such techniques, when applied to electronic ink, are often used to refresh the whole pen stroke after it is finished, after a pen-up event.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 5A, 5B illustrate a cycle of recursive reparameterization filtering, according to one embodiment of invention.

DETAILED DESCRIPTION

Figure 1A:
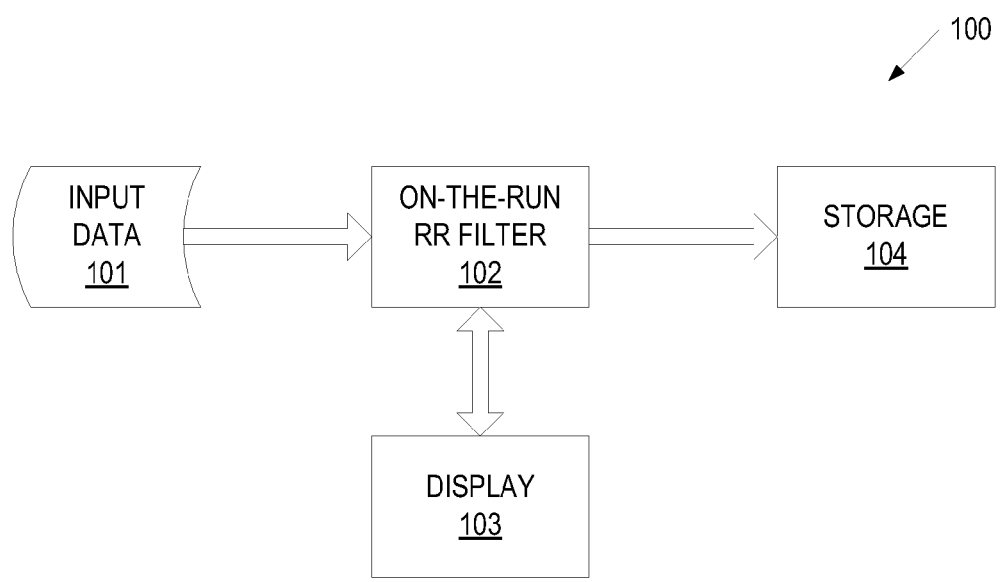
FIG. 1A is a block diagram of an exemplary system in which embodiments of the invention may operate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.).

System Overview

FIG. 1A illustrates an exemplary system 100 for handling graphical data, in which embodiments of the invention may operate. The source of data handled by the system 100 in real time may be an interactive writing and drawing (electronic ink). Alternatively, the source may be image data convertible into vector-graphic form. For example, drawings and handwritten materials presented as bitmaps can be converted in vector-graphic form by means of automatic or manual tracing. Similar conversion procedures can also be used for contours extracted from the halftone, color, and volumetric images.

System 100 includes an on-the-run filter 102 that prepares the data flow from input device 101 for on-the-run displaying and storing. In particular, the on-the-run filter 102 uses a parametric representation of a curve associated with the source data 101. For example, in the case of electronic ink, the source data from input device 101 may include a sequence of samples provided by a graphic tablet coupled to a computer, where each sample is represented by a pair of Cartesian coordinates. In one embodiment, the on-the-run filter 102 performs on-the-run, hidden from the user denoising of the source data without noticeable shrinkage, by performing recursive reparameterization filtering, described in greater detail below in conjunction with FIGS. 3 and 4. The resulting output is displayed as a trajectory of the moving point and stored in a storage medium 104 (e.g., in a data repository or database). The storage medium can include the data coder for compression (not shown). The storage medium 104 and the on-the-run filter 102 may be hosted by the same machine. Alternatively, the storage medium 104 and the on-the-run filter 102 may be hosted by different machines coupled to each other via a wired or wireless network (e.g., local network or public network).

The system 100 may also include a decoder (not shown) that can access the storage medium 103 directly or via a network. The decoder reconstructs the denoised source data from the storage 103. Data processed by filter 102 may be displayed on display 103.

Figure 1B:
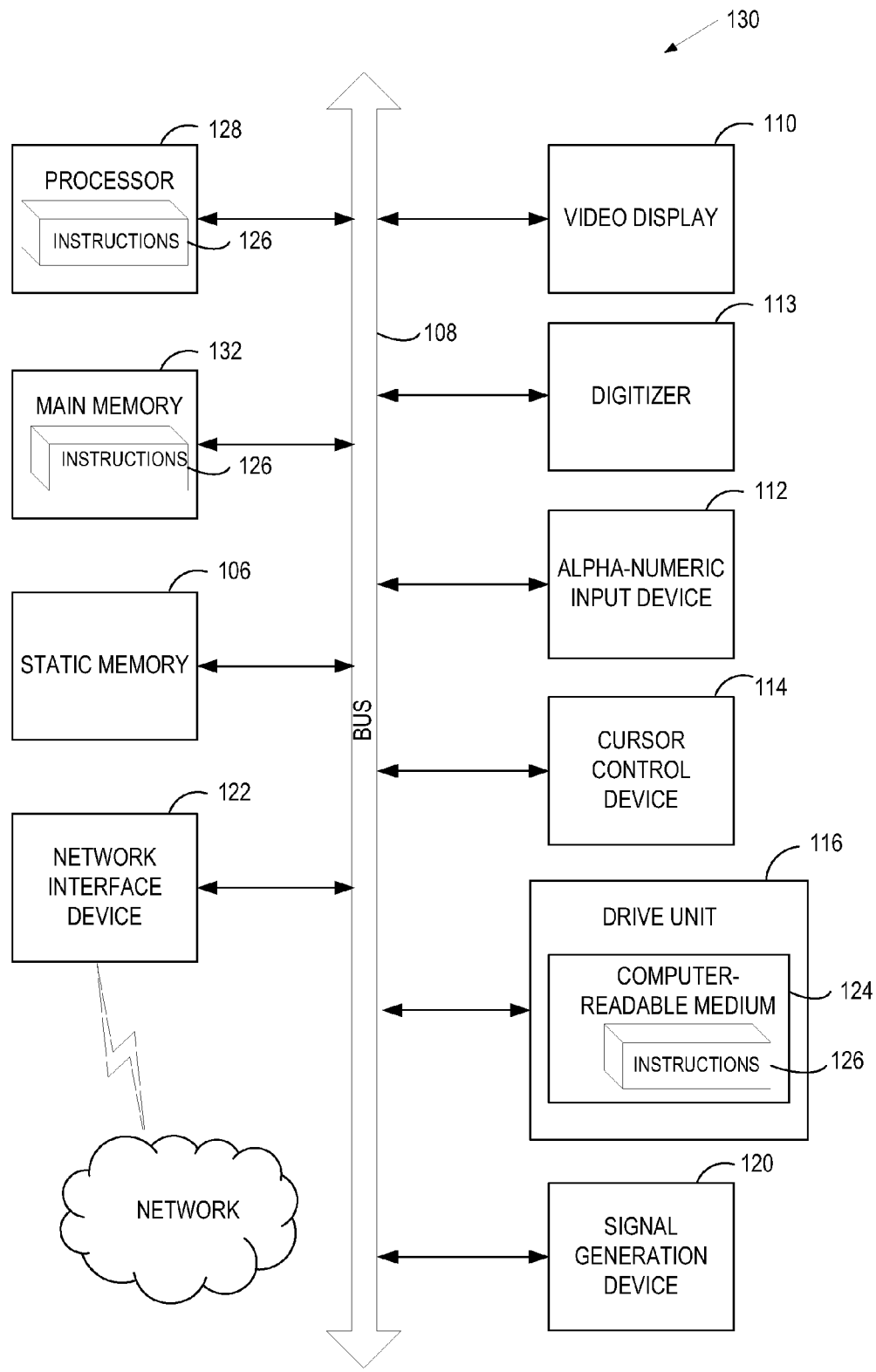
FIG. 1B is a block diagram of an exemplary computer system that may be used to perform one or more of the operations described herein.

FIG. 1B is a block diagram of an exemplary computer system 130 (e.g., a machine hosting an on-the-run filter 102 and/or a decoder that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 130 includes a processor 128, a main memory 132 and a static memory 106, which communicate with each other via a bus 108. The computer system 130 may further include a video display unit 110 (e.g., liquid crystal display (LCD) or a cathode ray tube (CRT)). In one embodiment, the computer system 130 also includes a pen digitizer 113 and accompanying pen or stylus (not shown) to digitally capture freehand input. Although the digitizer 113 is shown apart from the video display unit 110, the usable input area of the digitizer 113 may be co-extensive with the display area of the display unit 110. Further, the digitizer 113 may be integrated in the display unit 110, or may exist as a separate device overlaying or otherwise appended to the display unit 110.

The computer system 130 also includes an alpha-numeric input device 112 (e.g., a keyboard), a cursor control device 114 (e.g., a mouse), a disk drive unit 116, a signal generation device 120 (e.g., a speaker) and a network interface device 122.

The disk drive unit 116 includes a computer-readable medium 124 on which is stored a set of instructions (i.e., software) 126 embodying any one, or all, of the methodologies described above. The software 126 is also shown to reside, completely or at least partially, within the main memory 132 and/or within the processor 128. The software 126 may further be transmitted or received via the network interface device 122. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to include, but not be limited to, solid-state memories, optical and magnetic disks, and carrier wave signals.

Figure 2:
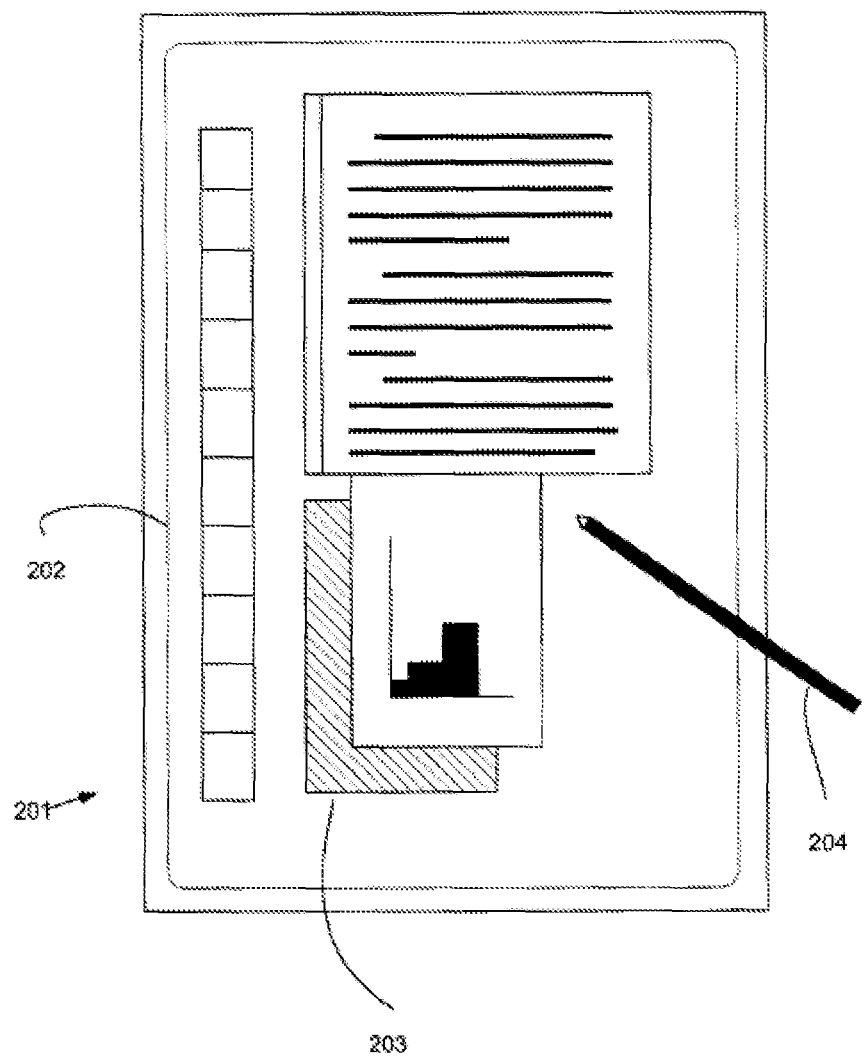
FIG. 2 illustrates an exemplary tablet and stylus computer that can be used with embodiments of the present invention.

FIG. 2 illustrates a tablet and stylus computer that can be used in accordance with some embodiments of the invention. Any or all of the features, subsystems, and functions in the system of FIG. 1B can be included in the computer of FIG. 2. Tablet PC 201 includes a large display surface 202, e.g., a digitizing flat panel display such as a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. The computer 201 interprets marks made using stylus 204 in order to manipulate data, enter text, and execute conventional computer application tasks such as spreadsheets, word processing programs, and the like.

A stylus may be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Basic Functionality

The basic procedures of embodiments of the present invention can be characterized as filtering with recursive reparameterization and chain filtering with recursive reparameterization, correspondingly RR filtering and chain RR filtering for short. The functional units performing these procedures are referred to hereafter as recursive reparameterization filter and chain recursive reparameterization filter, correspondingly RR filter and chain RR filter for short.

Figure 3:
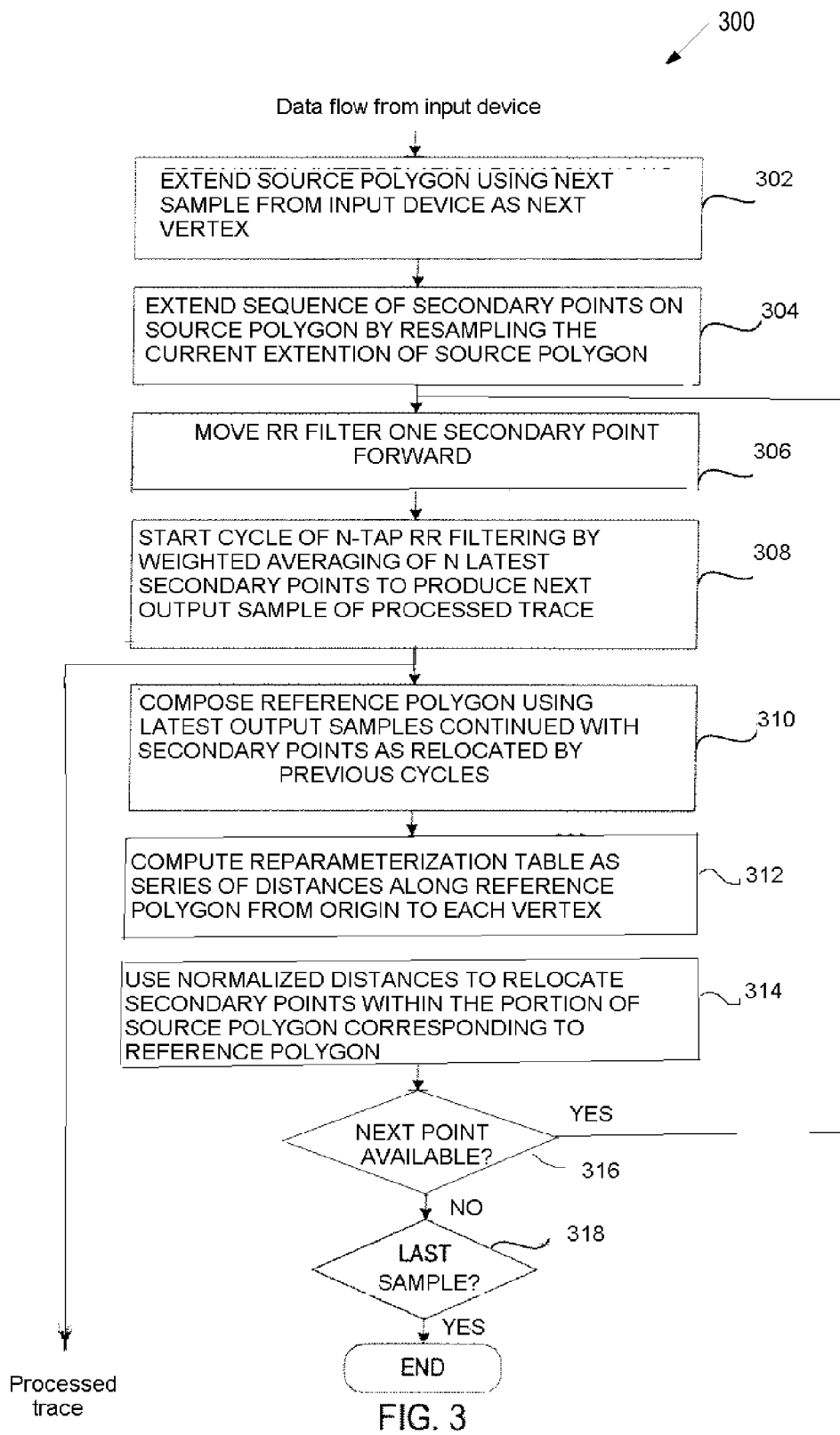
FIG. 3 is a flow diagram illustrating one embodiment of a recursive reparameterization filtering method.

FIG. 3 is a flow diagram of RR filtering, according to some embodiments of the invention. The RR filtering may be performed by processing logic that may comprise hardware (e.g., circuitry, dedicated logic, etc.), software (such as run on a general purpose computer system or a dedicated machine), or a combination of both. In one embodiment, processing logic resides in on-the-run filter 102 of FIG. 1.

Figure 4A:
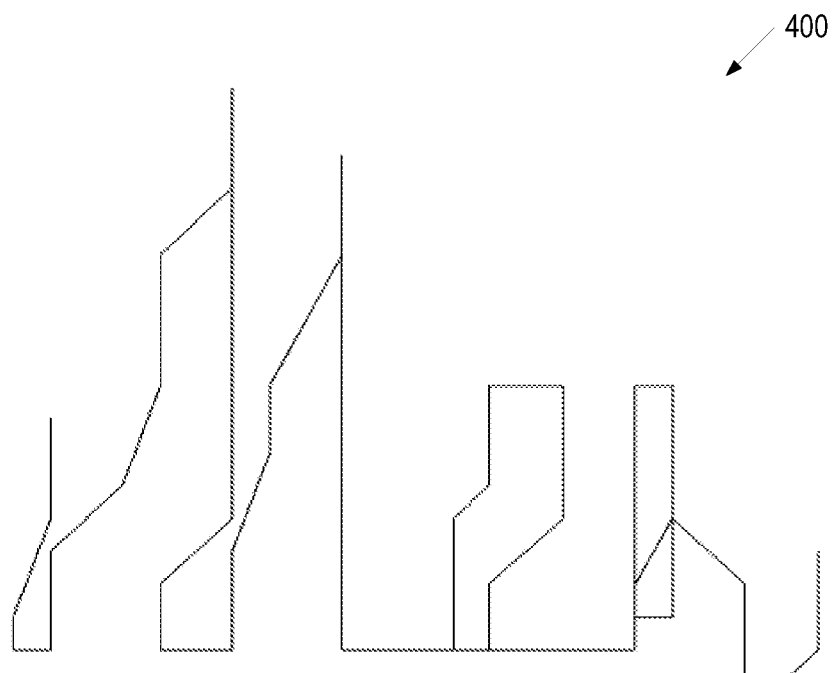
FIGS. 4A, 4B illustrate exemplary results of recursive reparameterization filtering according to an embodiment of the invention.

Referring to FIG. 3, the next cycle of RR filtering 300 begins at block 302 as the next sample points come from the trace generator. At block 302, the incoming sample points are treated as vertices of a polygon, which is designated a source polygon. The incoming sample points may be, for example, two-coordinate or three-coordinate samples provided by a graphic tablet, resulting, respectively, in the plane or space polygon defined and stored, up to the last vertex currently available, for future use at block 302. FIG. 4A illustrates an exemplary source polygon 400 for a specimen of noisy electronic ink. The specimen is a pen stroke captured as a plain curve by a hand-held device. The complete source polygon of the stroke is defined by 62 vertices.

Returning to FIG. 3, at block 304, processing logic resamples the incoming part of the source polygon to adjust the sampling rate for RR filtering and the consequent rendering of the trace. The new samples provided by block 304 are designated the secondary points of the source polygon. For example, the resampled source polygon may have an increased density of secondary points, as compared with the density of vertices.

Once the next segment of the source polygon is resampled and at least one next secondary point is available, the RR filter is moved one secondary point forward (block 306) and the next cycle of RR filtering is started. According to one embodiment, the N-tap RR filter performs, as the first step of the cycle, the weighted averaging of the latest N secondary points to produce the next output sample of the processed trace. It should be noted that the N latest secondary points to be averaged in the current cycle contain points that are already displaced along the source polygon from their initial positions by previous cycles of RR filtering. In one embodiment, at the second step of the cycle, a piece of the source polygon occupied by the sequence of last N secondary points is reparameterized, resulting in next displacements of secondary points in the sequence along the source polygon, except for the endpoints of the sequence. It should be noted that the latest output samples, up to the last one created by the current cycle, are used as a part of the reference sequence for reparameterization.

Two or more RR filters can be combined into a chain RR filter. For example, the chain RR filtering can be performed by a sequence of overlapping N-tap RR filters, wherein each next filter is delayed by one secondary point from the previous one. The cycle of chain RR filtering is a sequence of cycles performed, one after another, by constituent RR filters. In one embodiment, the output sample of the trace is produced by the last filter of the chain only. All previous filters are using their respective results of weighted averaging, which are designated phantom output samples, for reparameterization only. Using this process, the reparameterization of the small portion of the trace behind the moving point is intensified, as compared with the action of a single RR filter. As the next secondary point is available, the whole chain is moved one point forward, and the next cycle is started.

Figure 4B:
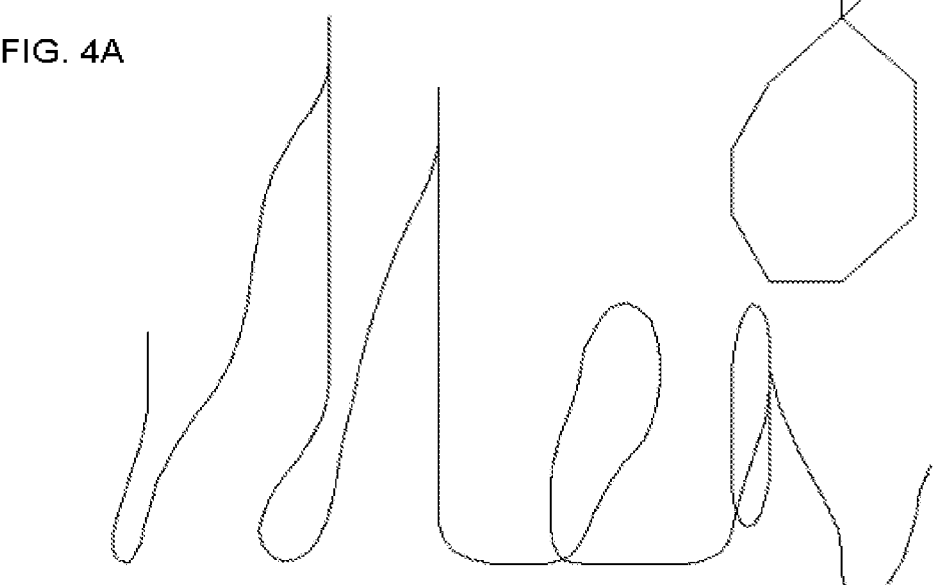

FIG. 4B illustrates the final result of on-the-run chain RR filtering for a trace specimen of FIG. 4A, according to some embodiments of the invention. In this example, the source polygon was resampled with the density of secondary points 3.5 times as higher as the density of vertices and processed with a chain RR filter comprising two 5-tap moving average RR filters, with a delay between them of one secondary point. In this example, the delay of the chain RR filtering, in terms of the arclength, is small enough to match the current segment of the source polygon.

The procedure of RR filtering, according to one embodiment, is described below in more detail. For the embodiments described herein, it is assumed that the N-tap RR filter is applied to the plain trace represented by two-coordinate samples, and that N is an odd number. Once the source polygon is defined up to the last available vertex at block 302 and the respective last segment of the source polygon is resampled at block 304, the sequence of current secondary points can be defined as $$\{x_{m,i}=x(s_{m,i}), y_{m,i}=y(s_{m,i})\}; m=0,1,2,\ldots,M, \quad (1)$$

where (x(s), y(s)) is a natural parametric representation of the source polygon in a Cartesian coordinate system x, y (with arclength s as a parameter), $(x_{m,i}, y_{m,i})$ and are, respectively, Cartesian coordinates and the natural coordinate of the m-th secondary point after i-th displacement of the point along the source polygon, and M is the number of the last secondary point currently available.

After RR filter is moved one secondary point forward to follow the pen (block 306), processing logic provides the next output sample of the trace as a weighted average of the latest N secondary points, up to M-th point (block 308). The number of secondary points to be averaged is designated the averaging window of the RR filter. According to the above defined conditions, the output sample corresponds to the central point of the averaging window, thus being delayed by $$\frac{N-1}{2}$$

secondary points from the latest, M-th, secondary point of the window. Coordinates of the output sample are calculated as $$X_{M-\frac{N-1}{2}} = \sum_{n=0}^{N-1} a_n x_{M-n, I(n)};$$

$$Y_{M-\frac{N-1}{2}} = \sum_{n=0}^{N-1} a_n y_{M-n, I(n)},$$

(2)

where values $\{a_n\}$ are filter coefficients (weights), and I(n) indicates the total number of displacements undergone by respective secondary point at a given state of the process, this time prior to current cycle of filtering:

$$I(0)=0; I(n)=n-1, n=1,2,$$ (3)

FIG. 5 illustrates an embodiment of the cycle of RR filtering using a 5-tap, moving average RR filter. A fragment of the specimen trace of FIG. 4A is shown at FIG. 5A to illustrate the disposition of secondary points prior to the cycle As the filter moves one point forward and reaches the M-th point, the averaging window of the filter covers secondary points 525, 520, 515, 510 and 505. As indicated by natural coordinates $\{s_{m,i}\}$ of these points, first and second points 525 and 520 stay as they were defined by resampling at block 304, and third, fourth, and fifth points 515, 510 and 505 were already displaced, respectively, 1, 2, and 3 times by previous cycles.

The cycle starts by calculating coordinates of the next, (M−2)-th, output sample (block 306) as follows:

$$X_{M-2} = \frac{1}{5} \sum_{n=0}^{4} x(s_{M-n, I(n)});$$

$$Y_{M-2} = \frac{1}{5} \sum_{n=0}^{4} y(s_{M-n, I(n)}).$$

(4)

Referring again to FIG. 3, at block 310, processing logic starts the second step of the cycle by composing the reference sequence of points for reparameterization. In one embodiment, the reference sequence is composed from N points, starting with $$\frac{N+1}{2}$$

latest output samples, up to the new sample obtained at the current cycle, and continuing with $$\frac{N-1}{2}$$

latest secondary points, up to M-th point. The points of reference sequence are treated by processing logic at block 310 as vertices of a polygon, which is designated reference polygon. Processing logic then computes the distance along the reference polygon from each vertex to the starting vertex of the reference polygon, which is the (M−N+1)-th output sample (block 312). The resulting sequence of N distances is stored in an updatable form as the current reparameterization table.

At block 314, processing logic normalizes the parameterization table and reparameterizes the related portion of the source polygon.

The number of secondary points in the portion to be reparameterized (which is typically the same as the number of vertices in the reference polygon) is designated as the reparameterization window of RR filter. In one embodiment, the reparameterization window coincides with the averaging window of RR filter. Generally, it is not necessary for the reparameterization window to coincide with the averaging window. For example, the averaging window may be a part of the reparameterization window.

First, processing logic divides each value in the reparameterization table by a length-normalizing factor $\lambda_k$, where k denotes the number of filtering cycles performed thus far (that is the number of output samples produced thus far;

$$k = M - \frac{N-1}{2}$$

at this stage of the process). The length-normalization factor $\lambda_k$ represents the ratio of total lengths between current (k-th) reference polygon and the related portion of source polygon to be reparameterized. The normalized parameterization table is then stored in an updatable form. Second, processing logic relocates the secondary points along the related portion of source polygon. The boundary points of the portion remain unchanged, while other secondary points are relocated along the source polygon in accordance with new distances defined by the normalized reparameterization table.

In one embodiment, the second step of the cycle, as performed by a 5-tap, moving average RR filter, is illustrated at FIG. 5B. First, the N-vertex reference polygon is formed using most recent output samples 550, 555, and 560 and the most recent secondary points 580 and 585. The reparameterization table is then prepared as a series of four distances $\sigma_{M-3}, \sigma_{M-2}, \sigma_{M-1}, \sigma_M$ along the reference polygon, from initial vertex to each of four other vertices. The distances are calculated as follows:

$$\sigma_{M-3} = \sqrt{(X_{M-3} - X_{M-4})^2 + (Y_{M-3} - Y_{M-4})^2},$$ (5)

$$\sigma_{M-2} = \sigma_{M-3} + \sqrt{(X_{M-2} - X_{M-3})^2 + (Y_{M-2} - Y_{M-3})^2} \quad (6)$$

$$\sigma_{M-1} = \sigma_{M-2} + \sqrt{(x(s_{M-1,0}) - X_{M-2})^2 + (y(s_{M-1,0}) - Y_{M-2})^2}, \quad (7)$$

$$\sigma_M = \quad (8)$$
$$\sigma_{M-1} + \sqrt{(x(s_{M,0}) - x(s_{M-1,0}))^2 + (y(s_{M,0}) - y(s_{M-1,0}))^2}.$$

The table is then normalized by dividing each value in the table by length-normalizing factor $$\lambda_{M-2} = \frac{\sigma_M}{s_{M-2}}, \quad (9)$$

where $s_{M-2}$ is the length of a portion of the source polygon to be reparameterized at the current, (M−2)-th cycle, that is the portion occupied by secondary points 565, 570, 575, 580, and 585. At the conclusion of the cycle, the actual reparameterization is performed by displacement of (M−3)-th, (M−2)-th, and (M−1)-th secondary points 570, 575, 580 from their current positions to new positions 586, 588, and 590 along the source polygon. The new positions 586, 588, and 590, are defined as $$s_{M-3,3} = s_{M-4,3} + \tilde{\sigma}_{M-3}; \quad (10)$$

$$s_{M-2,2} = s_{M-4,3} + \tilde{\sigma}_{M-2}; \quad (11)$$

$$s_{M-1,1} = s_{M-4,3} + \tilde{\sigma}_{M-1}; \quad (12)$$

where $\tilde{\sigma}_{M-3}, \tilde{\sigma}_{M-2}, \tilde{\sigma}_{M-1}$ are the respective distances of normalized reparameterization table. As the cycle is finished, processing logic at block 316 checks whether the next secondary point is available. If Yes, the RR filter is moved one point further. Alternatively, processing logic checks at block 318 whether a pen up event occurred. If Yes, the process stops.

Figures 6A, 6B:
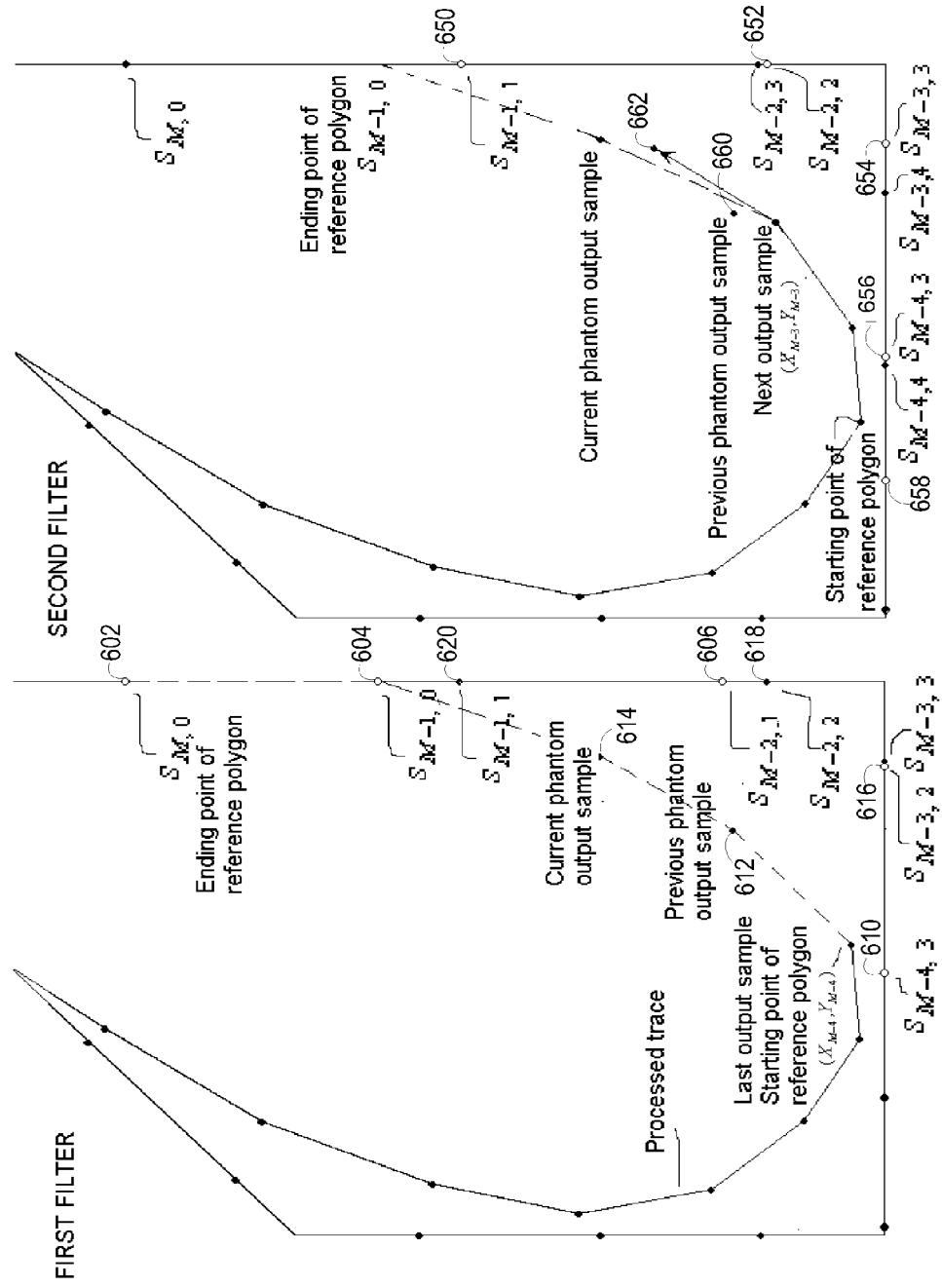
FIGS. 6A, 6B illustrate a cycle of chain recursive reparameterization filtering, according to one embodiment of invention.

FIGS. 6A and 6B illustrate the cycle of chain RR filtering with reference to the example in FIG. 4B, according to some embodiments of the invention. In this example, the source polygon is processed with a chain RR filter comprising two 5-tap moving average RR filters, with a delay between them of one secondary point. FIG. 6A shows how the disposition of points is affected by the cycle of the first RR filter in the chain. As the chain filter moves one point forward and reaches M-th point, the averaging window of the first filter in the chain covers secondary points 602, 604, 606, 616, and 610. As indicated by the natural coordinates $\{S_{m-1}\}$ of these points, first and second points 602 and 604 stay as they were defined by resampling at block 304, and third, fourth, and fifth points 606, 616, and 610 were already displaced, respectively, 1, 2, and 3 times by previous cycles, respectively.

The cycle starts by calculating coordinates of the next phantom output sample the same way as described above. The new phantom output sample is used to compose the reference polygon for reparameterization. In one embodiment, the reference polygon is formed with N vertices, starting with the latest, (M−4)-th output sample produced by the previous cycle of the chain and continuing, as shown by dashed line, with the previous and current phantom output samples 612 and 614 followed by secondary points 608 and 610, up to M-th point. Then the reparameterization table is derived from the reference polygon the same way as described above and used to actually relocate secondary points 604, 606 and 608 to their new positions 616, 618, and 620.

The second filter of the chain then performs the cycle, as illustrated at FIG. 6B. The second filter performs averaging of secondary points 650, 652, 654, 656, and 658 with numbers from M−5 to M−1, three of them at new positions $s_{M-3,3}$, $s_{M-2,2}$, and $s_{M-1,1}$, to produce the next, (M−3)-th output sample.

The new output sample is used to substitute the previous phantom output sample 660 as a vertex of the updated reference polygon. In one embodiment, the N-vertex reference polygon updated by the second RR filter of the chain is started with the 3 latest output samples available and continued, as shown by dashed line, with two vertices of previous reference polygon. As the final action of a cycle, three secondary points, 652, 654, and 656, are relocated again to their new positions $s_{M-4,4}$, $s_{M-3,4}$, and $s_{M-2,3}$.

The final disposition of points at FIG. 6B is supplemented with one further output sample 602 that would be produced at the next cycle of the chain. As can be seen from the example shown at FIGS. 6A and 6B, the consequent RR filters in the chain provide further enhancement of the trace and reduction in shrinkage.

What is claimed is:

1. A system comprising:
    an input device to trace a moving object and provide source data points corresponding to different locations of the moving object, wherein resampled data points are added in response to new source data points becoming available; and
    a first on-the-run filter, coupled to the input to provide output points corresponding to the source data and the resampled data points wherein the first on-the-run filter uses recursive reparameterization to progressively adjust positions of the resampled data points based on the output points and the resampled data points in response to the new source data points being added and wherein a subset of the resampled data points and the output points form a reference polygon that is used to adjust positions of the resampled data points.

2. The system of claim 1 further comprising:
    a display device, coupled to the first on-the-run filter, to display the output points.

3. The system of claim 1, further comprising:
    a storage device, coupled to the first on-the-run filter, to compress and store the output points.

4. The system of claim 3 further comprising:
    a decoder, coupled to the storage device, to reconstruct the output data points.

5. The system of claim 1 wherein the source data points are treated as vertices of a source polygon that includes the resampled data points.

6. The system of claim 1, further comprising:
    a second on-the-run filter that uses recursive reparameterization to further adjust positions of the resampled data points.

7. A system comprising:
    an input device to trace a moving object and provide source data points corresponding to different locations of the moving object, wherein resampled data points are added in response to new source data points becoming available; and
    a first on-the-run filter, coupled to the input to provide output points corresponding to the source data and the resampled data points wherein the first on-the-run filter uses recursive reparameterization to progressively adjust positions of the resampled data points based on the output points and the resampled data points in response to the new source data points being added and wherein each of the output points is a weighted average of a subset of the resampled data points.

8. The system of claim 7, further comprising:
a display device, coupled to the first on-the-run filter, to display the output points.

9. The system of claim 8, further comprising:
a decoder, coupled to the storage device, to reconstruct the output data points.

10. The system of claim 7, further comprising:
a storage device, coupled to the first on-the-run filter, to compress and store the output points.

11. The system of claim 7, wherein the source data points are treated as vertices of a source polygon that includes the resampled data points.

12. The system of claim 7, further comprising:
a second on-the-run filter that-uses recursive reparameterization to further adjust positions of the resampled data points.

13. A method for handling electronic ink using a processor, comprising:
receiving source data from an input device that traces a moving object to provide source data points corresponding to different locations of the moving object;
adding resampled data points in response to new source data points becoming available;
providing output points corresponding to the source data and the resampled data points;
using a first on-the-run filter that provides recursive reparameterization to progressively adjust positions of the resampled data points based on the output points and the resampled data points in response to the source data points being added; and
forming a reference polygon using a subset of the resampled data points and the output points, wherein the reference polygon is used to adjust positions of the resampled data points.

14. The method of claim 13 further comprising:
displaying the output points using a display device coupled to the first on-the-run filter.

15. The method of claim 13, further comprising:
compressing and storing the output data points using a storage device coupled to the first on-the-run filter.

16. The method of claim 15 further comprising:
reconstructing the compressed output data points using a decoder coupled to the storage device.

17. The method of claim 13 wherein the source data points are treated as vertices of a source polygon that includes the resampled data points.

18. The method claim 13, further comprising:
using a second on-the-run filter that provides recursive reparameterization to further adjust positions of the resampled data points.

19. A method for handling electronic ink using a processor, comprising:
receiving source data from an input device that traces a moving object to provide source data points corresponding to different locations of the moving object;
adding resampled data points in response to new source data points becoming available;
providing output points corresponding to the source data and the resampled data points; and
using a first on-the-run filter that provides recursive reparameterization to progressively adjust positions of the resampled data points based on the output points and the resampled data points in response to the source data points being added wherein each of the output points is a weighted average of a subset of the resampled data points.

20. The method of claim 19, further comprising:
displaying the output points using a display device coupled to the first on-the-run filter.

21. The method of claim 19, further comprising:
compressing and storing the output data points using a storage device coupled to the first on-the-run filter.

22. The method of claim 21, further comprising:
reconstructing the compressed output data points using a decoder coupled to the storage device.

23. The method of claim 19 wherein the source data points are treated as vertices of a source polygon that includes the resampled data points.

24. The method of claim 19, further comprising:
using a second on-the-run filter that provides recursive reparameterization to further adjust positions of the resampled data points.

25. A non-transitory computer-readable medium containing software that handles electronic ink, the software running on a processor and comprising:
executable code that receives source data from an input device that traces a moving object to provide source data points corresponding to different locations of the moving object;
executable code that adds resampled data points in response to new source data points becoming available;
executable code that provides output points corresponding to the source data and the resampled data points;
executable code that uses a first on-the-run filter that provides recursive reparameterization to progressively adjust positions of the resampled data points in response to the source data points being added; and
executable code that forms a reference polygon using a subset of the resampled data points and the output points, wherein the reference polygon is used to adjust positions of the resampled data points.

26. The non-transitory computer-readable medium of claim 25 further comprising:
executable code that displays the output points using a display device coupled to the first on-the-run filter.

27. The non-transitory computer-readable medium of claim 25, further comprising:
executable code that compresses and stores the output data points using a storage device coupled to the first on-the-run filter.

28. The non-transitory computer-readable medium of claim 27 further comprising:
executable code that reconstructs the compressed output data points using a decoder coupled to the storage device.

29. The non-transitory computer-readable medium of claim 25 wherein the source data points are treated as vertices of a source polygon that includes the resampled data points.

30. The non-transitory computer-readable medium of claim 25, further comprising:
executable code that uses a second on-the-run filter that provides recursive reparameterization to further adjust positions of the resampled data points.

31. A non-transitory computer-readable medium containing software that handles electronic ink, the software running on a processor and comprising:

executable code that receives source data from an input device that traces a moving object to provide source data points corresponding to different locations of the moving object;

executable code that adds resampled data points in response to new source data points becoming available;

executable code that provides output points corresponding to the source data and the resampled data points; and executable code that uses a first on-the-run filter that provides recursive reparameterization to progressively adjust positions of the resampled data points in response to the source data points being added wherein each of the output points is a weighted average of a subset of the resampled data points.

32. The non-transitory computer-readable medium of claim 31 further comprising:

executable code that displays the output points using a display device coupled to the first on-the-run filter.

33. The non-transitory computer-readable medium of claim 31, further comprising:

executable code that compresses and stores the output data points using a storage device coupled to the first on-the-run filter.

34. The non-transitory computer-readable medium of claim 33 further comprising:

executable code that reconstructs the compressed output data points using a decoder coupled to the storage device.

35. The non-transitory computer-readable medium of claim 31 wherein the source data points are treated as vertices of a source polygon that includes the resampled data points.

36. The non-transitory computer-readable medium of claim 31, further comprising:

executable code that uses a second on-the-run filter that provides recursive reparameterization to further adjust positions of the resampled data points.

\* \* \* \* \*